UNITED STATES PATENT OFFICE.

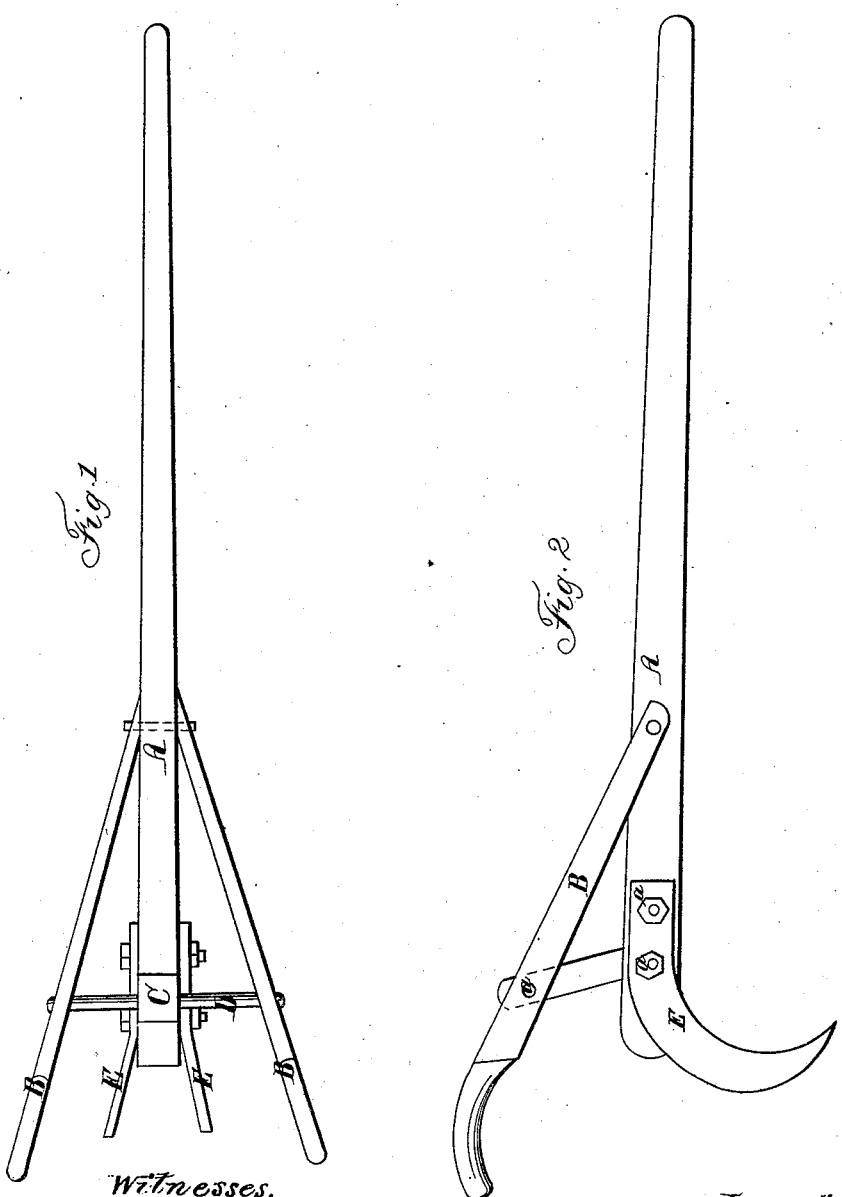

JAMES B. LYONS, OF MILTON, CONNECTICUT.

IMPROVEMENT IN STONE AND ROOT GRUBBERS.

Specification forming part of Letters Patent No. 42,094, dated March 29, 1864.

*To all whom it may concern:*

Be it known that I, JAMES B. LYONS, of Milton, in the town and county of Litchfield, in the State of Connecticut, have invented certain new and useful improvements which consist in a very simple and efficient machine for digging or loosening stones, pulling roots, tearing up brakes and bogs; and the following is a full and exact description of the same, reference being had to the accompanying drawings, making a part of this specification.

Figure 1 shows a plan or top view. Fig. 2 represents a side elevation.

The object of my invention is to facilitate the clearing the surface of land and prepare it for the plow by loosening and taking out small rocks and bowlders, such as would not require a larger machine, and also for pulling brake and other roots and bogs; and it consists in the simple arrangement and combination of a beam, a pair of handles, and two or more metal hooks secured to the beam or neap in such a position as to be operated by one yoke of cattle in the manner hereinafter described.

I make a beam, A, of sufficient length to hitch to the ring of a neck-yoke, upon which are placed a pair of inclined handles, B B, supported and held firmly in their position by an upright post, C, and a cross-bar, D, similar to the common shovel-plow.

On each side of the beam A, at the rear end, I secure by two bolts, *a a*, two strong iron prongs or hooks, E E, which extend down so as to have sufficient room to hook onto any projecting substance, and the hooks E E being so curved, they will readily fasten to a given angle, and relieve themselves from it as soon as it is loosened and permitted to roll or turn over; and should a root or any other substance to which the hooks or prongs E E fasten be beyond the strength of the team to break or remove, the curve and position of the hooks E E being such that as soon as the team slacks up the machine will be relieved and can be lifted by the handles B B over the obstacle by the driver.

By the use of this machine and one pair of cattle one man can loosen on the surface medium size and small stones more than ten times the quantity in a given time than can be done by any other process known or used.

Having thus described my invention, the mode of attaching to the team, and its operation, what I claim as new, and desire to secure by Letters Patent, is—

Two strong iron hooks or prongs, E E, when secured to a beam, A, sufficiently long to reach the ring of the yoke when oxen are used, or the ring of the neck-yoke when horses are employed, for the purpose of steadying the implement and preventing it bouncing about, in the manner as and for the purposes herein set forth.

JAMES B. LYONS.

Witnesses:
 THOMAS DWYER,
 DWIGHT C. KILBOURN.